US008699329B2

(12) United States Patent
Chiabaut et al.

(10) Patent No.: US 8,699,329 B2
(45) Date of Patent: *Apr. 15, 2014

(54) TIE-BREAKING IN SHORTEST PATH DETERMINATION

(75) Inventors: Jerome Chiabaut, Ottawa (CA); David Allan, Ottawa (CA); Nigel Bragg, Waaton Colville (GB); Peter Ashwood Smith, Gatineau (CA)

(73) Assignee: Rockstar Consortium US LP, Plano, TX (US)

( * ) Notice: Subject to any disclaimer, the term of this patent is extended or adjusted under 35 U.S.C. 154(b) by 242 days.

This patent is subject to a terminal disclaimer.

(21) Appl. No.: 13/023,823

(22) Filed: Feb. 9, 2011

(65) Prior Publication Data

US 2011/0128857 A1   Jun. 2, 2011

Related U.S. Application Data

(63) Continuation of application No. 11/964,478, filed on Dec. 26, 2007, now Pat. No. 7,911,944.

(51) Int. Cl.
*G01R 31/08* (2006.01)

(52) U.S. Cl.
USPC .......................................................... 370/229

(58) Field of Classification Search
USPC .................. 370/351–430, 229–240
See application file for complete search history.

(56) References Cited

U.S. PATENT DOCUMENTS

| | | | |
|---|---|---|---|
| 5,023,916 A * | 6/1991 | Breu | 382/150 |
| 5,914,936 A | 6/1999 | Hatono et al. | |
| 6,633,544 B1 | 10/2003 | Rexford et al. | |
| 6,697,333 B1 | 2/2004 | Bawa et al. | |
| 6,928,484 B1 | 8/2005 | Huai et al. | |
| 6,990,073 B1 | 1/2006 | Sandoval | |
| 7,224,668 B1 | 5/2007 | Smethurst et al. | |
| 7,239,609 B2 | 7/2007 | Yokota et al. | |
| 7,277,709 B2 | 10/2007 | Vadgama | |
| 7,382,734 B2 | 6/2008 | Wakumoto et al. | |

(Continued)

FOREIGN PATENT DOCUMENTS

| | | |
|---|---|---|
| EP | 0926860 A2 | 6/1999 |
| JP | 2004-129054 | 4/2004 |

(Continued)

OTHER PUBLICATIONS

I.E.E.E. Draft Amendment to I.E.E.E. Std. 802.1Q-2005, Dec. 17, 2008, Virtual Bridged Local Area Networks—Amendment 9: Shortest Path Bridging (180 pages).

(Continued)

*Primary Examiner* — Fan Ng

(74) *Attorney, Agent, or Firm* — Pearne & Gordon LLP

(57) ABSTRACT

A consistent tie-breaking decision between equal-cost shortest (lowest cost) paths is achieved by comparing an ordered set of node identifiers for each of a plurality of end-to-end paths. Alternatively, the same results can be achieved, on-the-fly, as a shortest path tree is constructed, by making a selection of an equal-cost path using the node identifiers of the diverging branches of the tree. Both variants allow a consistent selection to be made of equal-cost paths, regardless of where in the network the shortest paths are calculated. This ensures that traffic flow between any two nodes, in both the forward and reverse directions, will always follow the same path through the network.

46 Claims, 9 Drawing Sheets

(56) References Cited

U.S. PATENT DOCUMENTS

| | | |
|---|---|---|
| 7,385,986 B2 | 6/2008 | Ono et al. |
| 7,529,199 B1* | 5/2009 | Wijnands et al. ............. 370/256 |
| 7,567,564 B2 | 7/2009 | Tanaka |
| 7,606,161 B2 | 10/2009 | Kalkunte et al. |
| 7,911,944 B2 | 3/2011 | Chiabaut et al. |
| 2003/0193898 A1 | 10/2003 | Wong et al. |
| 2004/0032832 A1 | 2/2004 | Desai et al. |
| 2004/0052239 A1 | 3/2004 | Nesbitt |
| 2004/0105388 A1 | 6/2004 | Wilkins et al. |
| 2005/0073958 A1 | 4/2005 | Atlas et al. |
| 2005/0083936 A1 | 4/2005 | Ma |
| 2005/0259647 A1* | 11/2005 | Wakumoto et al. ........... 370/389 |
| 2006/0182035 A1 | 8/2006 | Vasseur |
| 2006/0198323 A1 | 9/2006 | Finn |
| 2006/0233108 A1 | 10/2006 | Krishnan |
| 2007/0008949 A1 | 1/2007 | Balandin |
| 2007/0025243 A1 | 2/2007 | Ayyagari et al. |
| 2007/0147255 A1 | 6/2007 | Oyman |
| 2008/0123532 A1* | 5/2008 | Ward et al. .................... 370/238 |
| 2008/0219268 A1 | 9/2008 | Dennison |
| 2009/0122718 A1 | 5/2009 | Klessig et al. |
| 2009/0168768 A1* | 7/2009 | Chiabaut et al. ............. 370/389 |
| 2010/0036606 A1 | 2/2010 | Jones |
| 2010/0284309 A1* | 11/2010 | Allan et al. ................... 370/256 |
| 2011/0128857 A1 | 6/2011 | Chiabaut et al. |

FOREIGN PATENT DOCUMENTS

| | | |
|---|---|---|
| JP | 2009-071575 | 4/2009 |
| WO | WO97/18637 A2 | 5/1997 |
| WO | 2012032426 A1 | 3/2012 |

OTHER PUBLICATIONS

Seaman, M., Shortest Path Bridging—Introduction to Draft 0.3, Shortest Path Bridging D03 Introduction, 802. May 1, 2006 (9 pages).

Seaman, M., An Update on Bridging Technologies—Change and Evolution: Why, What, and How, 802 Jul. 2005, Bridging Technology Update (28 pages).

Seaman, M., Shortest Path Bridging, Revision 0.4 Mar. 20, 2005 (4 pages).

Renata Teixeira et al; "Tie Breaking: Tunable Interdomain Egress Selection" IEEE/ACM Transactions on Networking, vol. 15, No. 4, Aug. 2007, pp. 761-774.

Extended European Search Report issued on Jul. 2, 2013 on Applicant's corresponding European Application No. EP12198879.4.

Canadian Patent Office, International Search Report and Written Opinion issued in corresponding PCT Application No. PCT/IB2008/003940, 8 pages, Dec. 23, 2009.

* cited by examiner

TIE-BREAKING IN SHORTEST PATH DETERMINATION

CROSS REFERENCE TO RELATED APPLICATION

This application is a continuation of U.S. Ser. No. 11/964,478 filed Dec. 26, 2007, now U.S. Pat. No. 7,911,944 which is hereby incorporated by reference.

FIELD OF THE INVENTION

This invention relates to consistently selecting paths among multiple possibilities, such as equal-cost shortest paths, in a packet-forwarding communications network, such as an Ethernet network.

BACKGROUND TO THE INVENTION

In packet-forwarding communications networks, a node can learn about the topology of the network and can decide, on the basis of the knowledge it acquires of the topology, how it will route traffic to each of the other network nodes. The main basis for selecting a path is path cost, which can be specified in terms of a number of hops between nodes, or by some other metric such as bandwidth of links connecting nodes, or both. Open Shortest Path First (OSPF) and Intermediate System-to-Intermediate System (IS-IS) are widely used link-state protocols which establish shortest paths based on each node's advertisements of path cost. These protocols typically do not attempt to tie-break between multiple, equal-cost, paths. Instead, they typically spread traffic across several equal-cost paths. The spreading algorithms are not specified and can vary from router to router. Alternatively, they may make a local selection of a single path, but without consideration of consistency with the selection made by other routers. Consequently, in either case the reverse direction of a flow is not guaranteed to use the path used by the forward direction.

Multicast routing protocols such as Multicast Open Shortest Path First (OSPF) depend on each router in a network constructing the same shortest path tree. For this reason, MOSPF implements a tie-breaking scheme based on link type, LAN vs. point-to-point, and router identifier to ensure that identical trees are produced. However, basing the tie-breaking decision on the parent with the largest identifier implies that, in general, the paths used by the reverse flows will not be the same as the paths used by the forward flows.

Spanning Tree Protocols (Spanning Tree Protocol (STP), Rapid Spanning Tree Protocol (RSTP), Multiple Spanning Tree Protocol (STP) are ways of creating loop-free spanning trees in an arbitrary topology. The Spanning Tree Protocol is performed by each node in the network. All of the Spanning Tree Protocols use a local tie-breaking decision based on (bridge identifier, port identifier) to select between equal-cost paths. In Spanning tree a root node is elected first, and then the tree is constructed with respect to that root by all nodes. So, although all paths are symmetrical for go and return traffic (by definition, a simple tree makes this the only possible construct), the election process is slow and the simple tree structure cannot use any redundant capacity. Similarly, Radia Perlman's Rbridges proposal uses the identifier of the parent node as tie-breaker.

Mick Seaman in his Shortest Path Bridging proposal to the IEEE 802.1 Working Group (http://www.ieee802.org/1/files/public/docs2005/new-seaman-shortest-path-0305-02.pdf) describes a simple protocol enhancement to the Rapid Spanning Tree Protocol which enforces consistent tie-breaking decisions, by adding a 'cut vector'. The proposal uses a VID per node, to identify a Spanning Tree per node. In order to fit all the information that needs to be transmitted by a bridge in a single legal Ethernet frame, this technique currently limits the size of the Ethernet network to 32 bridges.

FIG. 1 illustrates how, even for a trivial network example, a tie-breaking method based on the parent node identifier fails to produce symmetric paths. In this example, the links are considered as having equal-cost and so the determination of path cost simply considers the number of hops. Consider first computing the path from A to B. When the computation reaches node 2, the existence of equal-cost paths will be discovered. There is a first path (A-1-3-6) and a second path (A-1-4-5). If the tie-breaking algorithm selects a path based on the parent node with the smallest identifier, it will select the second path (A-1-4-5) because node identifier 5 is smaller than node identifier 6. However, now consider computing the path from B to A. When the computation reaches node 1, the existence of equal-cost paths will be discovered. There is a first path (B-2-6-3) and a second path (B-2-5-4). Using the same tie-breaking criterion, the tie-breaking algorithm selects the first path (B-2-6-3) because node identifier 3 is smaller than node identifier 4. So, it can be seen that the shortest path computations made by nodes A and B provide inconsistent results.

There is a requirement in some emerging protocols, such as Provider Link State Bridging (PLSB), a proposal to IEEE 802.1aq, to preserve congruency of forwarding across the network for both unicast and unknown/multicast traffic and to use a common path in both forward and reverse directions of flow. Accordingly, it is important that nodes can consistently arrive at the same decision when tie-breaking between equal-cost paths. Furthermore, it is desirable that a node can perform the tie-breaking with the minimum amount of processing effort.

SUMMARY OF THE INVENTION

A first aspect of the invention provides a method of determining forwarding information for use in forwarding packets at a first node of a packet-forwarding network. The method determines the shortest paths between the first node and a second node of the network and determines when a plurality of shortest paths have substantially equal-cost. The method forms, for each substantially equal-cost path, a set of node identifiers which define the set of nodes in the path and then orders each set of node identifiers using a first ordering criterion to form a path identifier. The first ordering criterion is independent of the order in which node identifiers appear in the path. The method then selects between the plurality of equal-cost paths by comparing the path identifiers. Each node of the network has a unique node identifier.

Advantageously, the first ordering criterion is increasing lexicographic order or decreasing lexicographic order, although any ordering criterion can be used which creates a totally ordered set of node identifiers.

Preferably, the method further comprises ordering the plurality of path identifiers into an ordered list using a second ordering criterion. Similarly, the second ordering criterion can be increasing lexicographic order, decreasing lexicographic order or any ordering criterion which creates a totally ordered set of path identifiers.

Another aspect of the invention provides a method of determining forwarding information for use in forwarding packets at a first node of a packet-forwarding network. The method comprises determining shortest paths between the first node and a second node of the network by iteratively forming a shortest path tree and determines, while forming the shortest path tree, when a plurality of paths have equal-cost, each equal-cost path comprising a branch which diverges from a divergence node common to the equal-cost paths. The method identifies, in each diverging branch, a node identifier using a first selection criterion to form a branch identifier and selects between the plurality of branches by comparing the branch identifiers.

Advantageously, the method uses a total ordering criterion to compare and select a node identifier in each branch, such as lexicographic order.

Advantageously, the method records the node identifier which meets the first selection criterion in each of the diverging branches while backtracking to the divergence node. This has an advantage in further simplifying computation and reducing storage requirements.

Both aspects of the invention can be used to select two equal-cost paths by using different first ordering/selection criteria and a common second ordering/selection criterion or by using a common first ordering criterion/selection and different second ordering/selection criteria. Three or four equal-cost paths can be selected in a similar manner by consistently applying the first and second ordering/selection criteria at nodes and selecting identifiers at a particular position in the ordered lists.

The invention can be used as a tie-breaker to select between equal-cost paths by comparing an ordered set of node identifiers for each of a plurality of end-to-end paths. Alternatively, it has been found that the same results can be achieved, on-the-fly, as a shortest path tree is constructed, by making a selection of an equal-cost path using the node identifiers of the diverging branches of the tree, local to where the selection decision needs to be made. This has advantages of reducing the amount of computation, and reducing the amount of data which needs to be stored. Branches can be compared on a pair-wise basis to further reduce the amount of computation. This becomes particularly important as the size and complexity of the network increases. Both variants of the invention have the important property of allowing a consistent selection to be made of equal-cost paths, regardless of where in the network the shortest paths are calculated. This ensures that traffic flow between any two nodes, in both the forward and reverse directions, will always follow the same path through the network.

The invention is not intended to be restricted to any particular way of determining a shortest path: Dijkstra's algorithm, Floyd's algorithm, or any other suitable alternative can be used.

The invention can be used as a tie-breaker between equal-cost paths having exactly the same value, or paths which are within a desired offset of one another both in terms of link metric or number of hops. This may be desirable in real life situation to increase the diversity between the set of eligible paths. For example, it may not always be cost-effective to deploy nodes and links in the symmetrical fashion in general required to achieve exactly equal-cost between any two endpoints. By relaxing the constraint to requiring that the hop count on different routes be within one hop of each other, modest asymmetry can still result in eligible routes, and loop-free topology is still guaranteed because a difference of two hops is the minimum necessary to achieve a looping path.

It will be understood that the term "shortest path" is not limited to determining paths based only on distance, and is intended to encompass any metric, or combination of metrics, which can be used to specify the "cost" of a link. A non-exhaustive list of metrics is: distance, number of hops, capacity, speed, usage, availability.

The method is stable in the sense that the selection of an equal-cost shortest path is not affected by the removal of parts of the network that are not on the selected paths, such as failed nodes or links.

Advantageously, the network is an Ethernet network although the invention can be applied to other types of packet-forwarding networks, especially those that have a requirement for symmetrical traffic-routing paths.

The functionality described here can be implemented in software, hardware or a combination of these. The invention can be implemented by means of a suitably programmed computer or any form of processing apparatus. Accordingly, another aspect of the invention provides software for implementing any of the described methods. The software may be stored on an electronic memory device, hard disk, optical disk or other machine-readable storage medium. The software may be delivered as a computer program product on a machine-readable carrier or it may be downloaded to a node via a network connection.

A further aspect of the invention provides a network node comprising a processor which is configured to perform any of the described methods.

A further aspect of the invention provides a network of nodes which each consistently apply the described methods to select between equal-cost paths.

BRIEF DESCRIPTION OF THE DRAWINGS

Embodiments of the invention will be described, by way of example only, with reference to the accompanying drawings in which.

DESCRIPTION OF PREFERRED EMBODIMENTS

Figure 2:
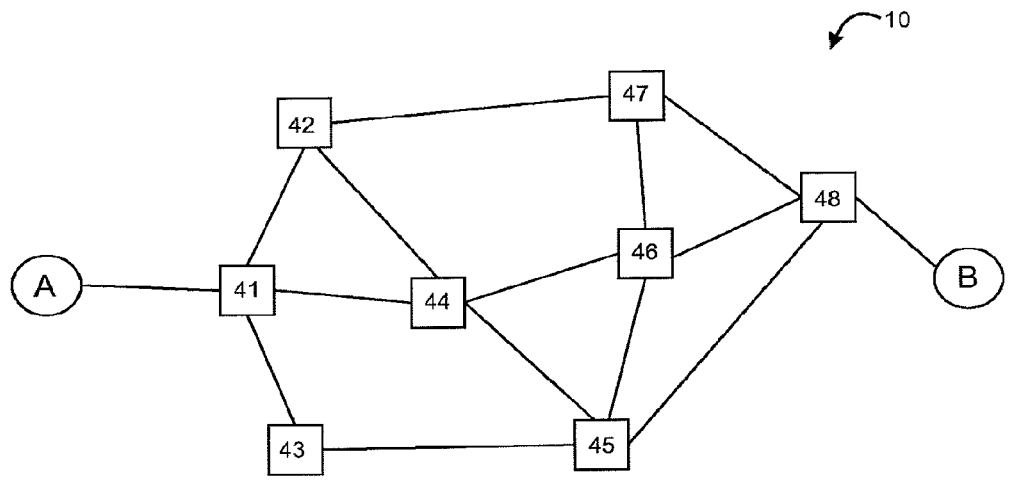
FIG. 2 shows an example of a packet-forwarding network in which the invention can be implemented.
Figure 3:
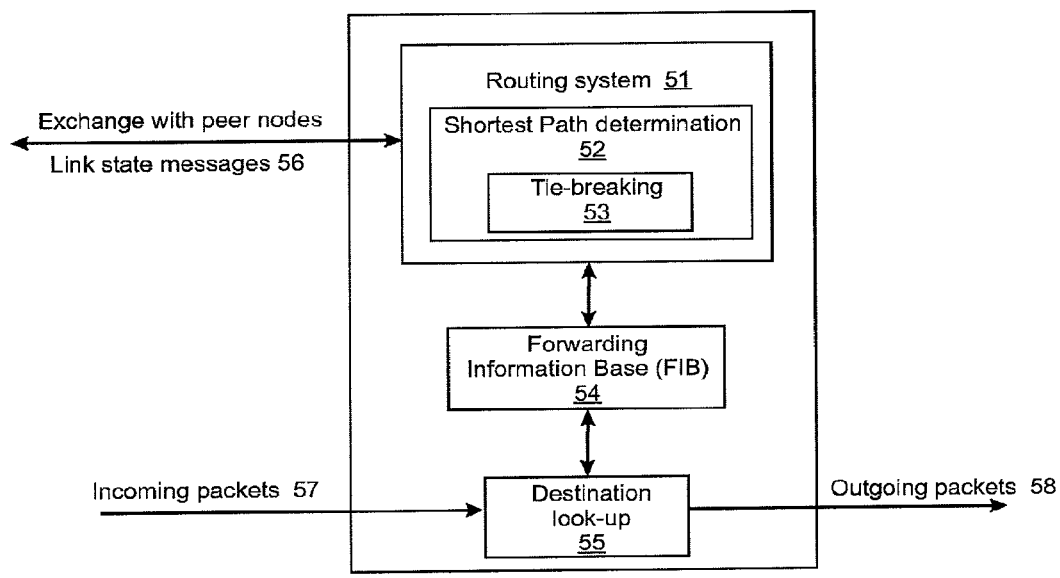
FIG. 3 schematically shows apparatus at one of the bridging nodes of FIG. 2.

FIG. 2 shows an example of a link state protocol controlled Ethernet network 10 in which the invention can be implemented and FIG. 3 schematically shows apparatus at one of the nodes 41-48. Nodes (also called bridges, or bridging nodes) 41-48 forming the mesh network exchange link state advertisements 56 with one another. This is achieved via the well understood mechanism of a link state routing system. A routing system module 51 exchanges information 56 with peer nodes in the network regarding the network topology using a link state routing protocol. This exchange of information allows the nodes to generate a synchronized view of the network topology. At each node, a Shortest Path Determination module 52 calculates a shortest path tree, which determines the shortest path to each other node. The shortest paths determined by module 52 are used to populate a Forwarding Information Base 54 with entries for directing traffic through the network. As will be described in greater detail below, situations will arise when module 52 will encounter multiple equal-cost paths. A tie-breaking module 53 selects one (or more) of the equal-cost paths in a consistent manner. In normal operation, packets are received 57 at the node and a destination lookup module 55 determines, using the FIB 54, the port (or multiple ports in the case of multicast distribution) over which the received packet should be forwarded 58. If there is not a valid entry in the FIB 54 then the packet may then be discarded. It will be appreciated that the modules shown in FIG. 3 are for illustrative purposes only and may be implemented by combining or distributing functions among the modules of a node as would be understood by a person of skill in the art.

Various shortest path algorithms can be used to determine if a given node is on the shortest path between a given pair of bridges. An all-pairs shortest path algorithm such as Floyd's algorithm [R. Floyd: Algorithm 97 (shortest path), Communications of the ACM, 7:345, 1962] or Dijkstra's single-source shortest path algorithm [E. W. Dijkstra: A note on two problems in connexion with graphs, Numerical Mathematics, 1:269-271, 1959] can be implemented in the node 41-48 to compute the shortest path between pairs of nodes. It should be understood that any suitable shortest path algorithm could also be utilized. The link metric used by the shortest path algorithm can be static or dynamically modified to take into account traffic engineering information. For example, the link metric can include a measure of cost such as capacity, speed, usage and availability.

By way of introduction to the problem, the requirements of a tie-breaking algorithm which can make consistent decisions between equal-cost paths will firstly be described. The list of requirements is set out in Table 1 below:

TABLE 1

| # | Requirement | Description |
|---|---|---|
| 1 | Complete | The tie-breaking algorithm must always be able to choose between two paths |
| 2 | Commutative | tiebreak(a, b) = tiebreak(b, a) |
| 3 | Associative | tiebreak(a, tiebreak(b, c)) = tiebreak(tiebreak(a, b), c) |
| 4 | Symmetric | tiebreak(reverse(a), reverse(b)) = reverse(tiebreak(a, b)) |
| 5 | Local | tiebreak(concat(a, c), concat(b, c)) = concat(tiebreak(a, b), c) |

The essence of a tie-breaking algorithm is to always 'work'. No matter what set of paths the algorithm is presented with, the algorithm should always be able to choose one and only one path. First and foremost, the tie-breaking algorithm should therefore be complete (1). For consistent tie-breaking, the algorithm must produce the same results regardless of the order in which equal-cost paths are discovered and tie-breaking is performed. That is, the tie-breaking algorithm should be commutative (2) and associative (3). The requirement that tie-breaking between three paths must produce the same results regardless of the order in which pairs of paths are considered (3) is not so obvious and yet it is absolutely necessary for consistent results as equal-cost paths are discovered in a different order depending on the direction of the computation through the network. The tie-breaking algorithm must be symmetric (4), i.e. the tie-breaking algorithm must produce the same result regardless of the direction of the path: the shortest path between two nodes A and B must be the reverse of the shortest path between B and A. Finally, locality is a very important property of shortest paths that is exploited by routing systems (5). The locality property simply says that: a sub-path of a shortest path is also a shortest path. This seemingly trivial property of shortest paths has an important application in packet networks that use destination-based forwarding. In these networks, the forwarding decision at intermediate nodes along a path is based solely on the destination address of the packet, not its source address. Consequently, in order to generate its forwarding information, a node needs only compute the shortest path from itself to all the other nodes and the amount of forwarding information produced grows linearly, not quadratically, with the number of nodes in the network. In order to enable destination-based forwarding, the tie-breaking algorithm must therefore preserve the locality property of shortest paths: a sub-path of the shortest path selected by the tie-breaking algorithm must be the shortest path selected by the tie-breaking algorithm.

Figure 1:
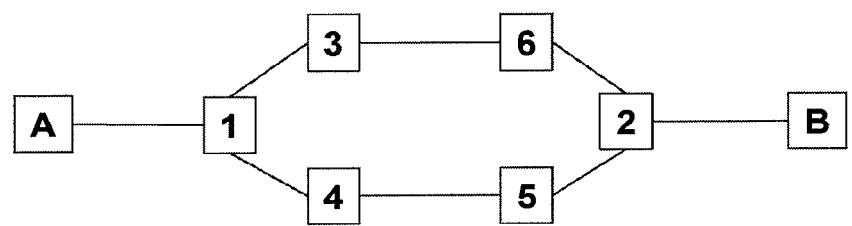
FIG. 1 shows a network topology having equal-cost paths.
Figure 4:
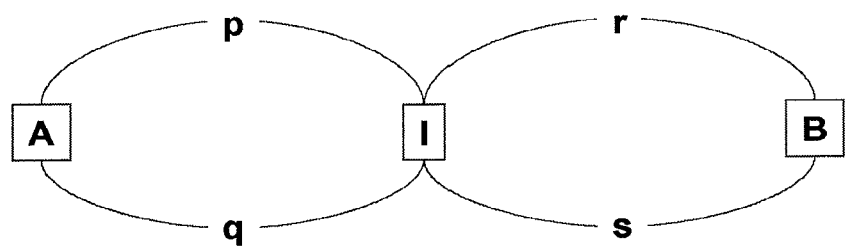
FIG. 4 shows the locality of tie-breaking decisions.

Considerations of computational efficiency put another seemingly different requirement on the tie-breaking algorithm: the algorithm should be able to make a tie-breaking decision as soon as equal-cost paths are discovered. FIG. 4 illustrates this point. An intermediate node I is connected by two equal-cost paths, p and q, to node A and by another pair of equal-cost paths, r and s, to node B. There are therefore four equal-cost paths between nodes A and B, all going through node I: p+r, p+s, q+r, q+s. As the computation of the shortest path from A to B progresses, the existence of equal-cost sub-paths between A and I will be discovered first. To avoid having to carry forward knowledge of these two paths, the tie-breaking algorithm should be able to choose between them as soon as the existence of the second equal-cost shortest sub-path is discovered. The tie-breaking decisions made at intermediate nodes will ultimately affect the outcome of the computation. By eliminating one of the two sub-paths, p and q, between nodes A and I, the algorithm removes two of the four shortest paths between nodes A and B from further consideration. Similarly, in the reverse direction, the tie-breaking algorithm will choose between sub-paths r and s before making a final determination. These local decisions must be consistent with one another and, in particular, the choice between two equal-cost paths should remain the same if the paths were to be extended in the same way. For instance, in the case depicted in FIG. 3, the tie-breaking algorithm should verify the following four identities:

tiebreak(concat(p, r), concat(q, r))=concat(tiebreak(p, q), r)

tiebreak(concat(p, s), concat(q, s))=concat(tiebreak(p, q), s)

concat(p, tiebreak(r, s))=tiebreak(concat(p, r), concat(p, s))

concat(q, tiebreak(r, s))=tiebreak(concat(q, r), concat(q, s))

It turns out that the symmetry (4) and locality (5) conditions are both necessary and sufficient to guarantee that the tie-breaking algorithm will make consistent local decisions, a fact that can be exploited to produce very efficient implementations of the single-source shortest path algorithm in the presence of equal-cost shortest paths.

The list of requirements set out in Table 1 is not intended to be exhaustive, and there are other properties of shortest paths that could have been included in Table 1. For example, if a link which is not part of a shortest path is removed from the graph, the shortest path is not affected. Likewise, the tie-breaking algorithm's selection between multiple equal-cost paths should not be affected if a link which is not part of the selected path is removed from the graph, and that even if this link is part of some of the equal-cost paths that were rejected by the algorithm.

Figure 5:
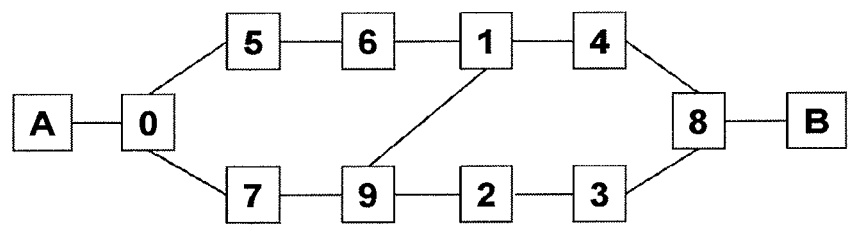
FIGS. 5 to 7 show example network topologies for illustrating calculation of shortest paths.

A first embodiment of a consistent tie-breaking algorithm will now be described. This algorithm begins by forming a path identifier for each path. The path identifier is an ordered list of the identifiers of each node traversed by the path through the network. The node identifiers are sorted in lexicographic order. The path identifier is the resulting concatenation of the ordered node identifiers. FIG. 5 shows an example network, with end nodes A, B and intermediate nodes 0-9. A first path (along the top of FIG. 5) between nodes A and B traverses nodes having the node identifiers A-0-5-6-1-4-8-B. After ordering the list of node identifiers in ascending lexicographic order, the path can be represented by the path identifier 014568AB. This construction ensures that a path and its reverse will have the same path identifier. Furthermore, because the algorithm is only dealing with shortest paths or nearly shortest paths, only two paths—the direct path and the corresponding reverse path—can share an identifier. Finally, the tie-breaking algorithm simply selects the path with the smallest (or largest) path identifier. The algorithm can be summarised as:

1) Sort the set of identifiers of the nodes in the path according to a first ordering criterion which achieves a total ordering of the set of node identifiers. A preferred first ordering criterion is increasing or decreasing lexicographic order;

2) Concatenate the set of ordered node identifiers to create a path identifier;

3) Sort the path identifiers according to a second ordering criterion which achieves a total ordering of the set of path identifiers. A preferred second ordering criterion is increasing or decreasing lexicographic order;

4) Select the path whose path identifier appears at one end (first or last) of the sorted set of path identifiers. Advantageously, this step selects the path identifier appearing first in the ordered set of path identifiers.

Each node in the network that performs this algorithm consistently uses the same ordering criteria and selects a path at the same agreed position in the set of path identifiers, in order to select the same path.

The term "lexicographic order" means the set of node identifiers are arranged in order of size of identifier. So, if node identifiers are alphabetic, the set of node identifiers are arranged in alphabetic order A, B, C, D . . . etc.; if node identifiers are numerical, the set of node identifiers are arranged in numerical order. Clearly, this scheme can accommodate any way of labelling nodes, and any combination of types of identifier. For example, a mix of numbers and letters could be ordered by agreeing an order for numbers with respect to letters (e.g. order numbers first, then letters). Alternatively, each character can be given it's American Standard Code for Information Interchange (ASCII) code and the ASCII codes can be sorted in increasing (decreasing) order. Each node uses the same convention to order the node identifiers of paths in the same manner. This algorithm will produce consistent results because: there is a one-to-one mapping between a path (strictly speaking between the pair made up of a path and its reverse) and its identifier, and there is a total ordering of the path identifiers.

Referring again to FIG. 5, the top path between nodes A and B is represented, after ordering, by the path identifier 014568AB. Similarly, a second path between nodes A and B traverses nodes A-0-7-9-1-4-8-B and this can be represented, after ordering, by the path identifier 014789AB. Finally, a third path (along the bottom of FIG. 5) between nodes A and B traverses nodes A-0-7-9-2-3-8-B and this can be represented, after ordering, by the path identifier 023789AB. The tie-breaking algorithm compares each element of the ordered path identifier, in an agreed direction. In this example, the convention that will be used is that each node selects the lowest of the ordered path identifiers, when the path identifiers are compared in a particular direction (e.g. left-to-right). The ordered path identifiers, for the three equal-cost paths are:

014568AB
014789AB
023789AB

Starting with the left-hand element of the identifiers, all three path identifiers begin with '0'. The next elements are '1' or '2', so only the top two identifiers need to be considered any further. Reaching the fourth element, "0145 . . . " is smaller than "0147 . . . " and so the top path is selected. Real node identifiers in IS-IS and Ethernet are composed of six 8-bit bytes and are usually written as a hexadecimal string such as: 00-e0-7b-c1-a8-c2. Nicknames of nodes can also be used, providing they are used consistently.

Figure 6:
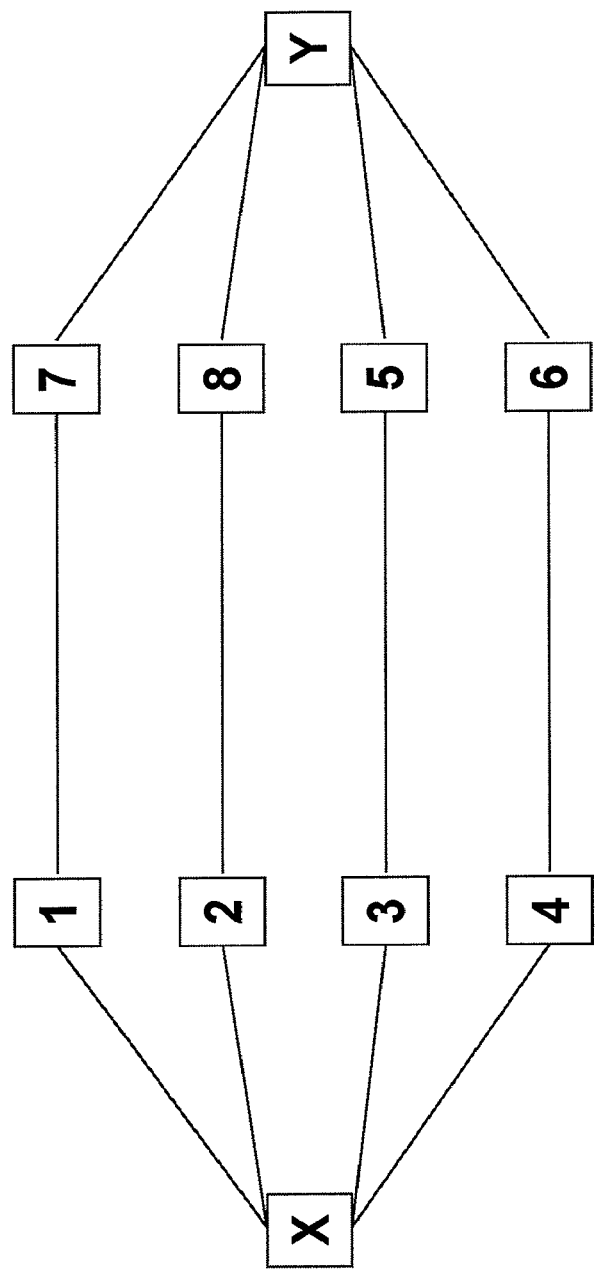

FIG. 6 shows a simple network topology to illustrate the effects of different ordering criteria. Two nodes, X, Y, are connected by four equal-cost paths having the node identifiers 1-8. Four possible options will now be described:

Sort node IDs by ascending order; sort path IDs by ascending order; select first (smallest) path ID. If the node identifiers in each path are ordered in ascending order of size (e.g. the top path with nodes 1, 7 becomes 17), that gives the path identifiers 17, 28, 35, 46. Arranging these path identifiers in ascending order of size, and selecting the first path identifier in the ordered list, has the result of selecting the first (top) path, with the nodes 1 and 7.

Sort node IDs by ascending order; sort path IDs by ascending order; select last (largest) path ID. This option has the result of selecting the last (bottom) path, with the nodes 4 and 6.

Sort node IDs by descending order; sort path IDs by ascending order; select first (smallest) path ID. Sorting the node identifiers in each path in descending order of size gives path identifiers (71, 82, 53, 64). Arranging these path identifiers in ascending order of size gives (53, 64, 71, 82) and selecting the first (smallest) path identifier in the ordered list, has the result of selecting the third path, with the nodes 3 and 5.

Sort node IDs by descending order; sort path IDs by ascending order; select last (largest) path ID. This option has the result of selecting the second path, with the nodes 8 and 2.

As will be described in more detail below, there are situations in which it is desirable for nodes to apply multiple, different, ordering and/or selection criteria to select multiple equal-cost paths.

So far this description assumes that the algorithm is non-local and that tie-breaking is performed after all the equal-cost paths have been found. However, it has been found that a local version of this algorithm can produce the same results by considering only the nodes on the diverging branches. Indeed, the tie-breaking result depends only on the relative positions of the smallest node identifier in the diverging branches. A second embodiment of a consistent tie-breaking algorithm can be summarised as:

1) Find the node identifier in the diverging branch of the first path which meets a first selection criterion. This can be considered a branch identifier for the first path;

2) Find the node identifier in the diverging branch of the second path which meets the first selection criterion. This can be considered a branch identifier for the second path;

3) Select one of the paths using a second selection criterion, which operates on the branch identifiers selected by steps (1) and (2).

Preferred options for the first selection criterion are to find the node identifier which is the first (or last) when the node identifiers are arranged using a total ordering scheme, such as lexicographic order (increasing or decreasing lexicographic order). As will be explained below, it is not necessary for the scheme to compile the total set of node identifiers in a branch and then order the set. Instead, the scheme can iteratively compare pairs of node identifiers using an awareness of lexicographic order. Similarly, preferred options for the second selection criterion are to find the branch identifier which is the first (or last) when the branch identifiers are arranged using a total ordering scheme, such as lexicographic order (increasing or decreasing lexicographic order).

Referring again to the topology of FIG. 6, the four equal-cost paths between nodes X and Y can represent four equal-cost diverging branches from a parent node X. The tie-breaking algorithm needs to select one of the four branches. There are four possible options:

- Identify the smallest node ID in each branch. This results in (1, 2, 3, 4) as the branch identifiers. Then, identify the smallest of the branch identifiers. This has the result of selecting the first (top) path, with the nodes 1 and 7.
- Identify the smallest node ID in each branch. Then, identify the largest of the branch identifiers. This option has the result of selecting the last (bottom) path, with the nodes 4 and 6.
- Identify the largest node ID in each branch. This results in (5, 6, 7, 8) as the branch identifiers. Then, identify the smallest of the branch identifiers. This has the result of selecting the path with the nodes 3 and 5.
- Identify the largest node ID in each branch. Then, identify the largest of the branch identifiers. This option has the result of selecting the path with the nodes 2 and 8.

As will be described in more detail below, there are situations in which it is desirable for nodes to apply multiple, different, ordering and/or selection criteria to select multiple equal-cost paths.

Figure 7:
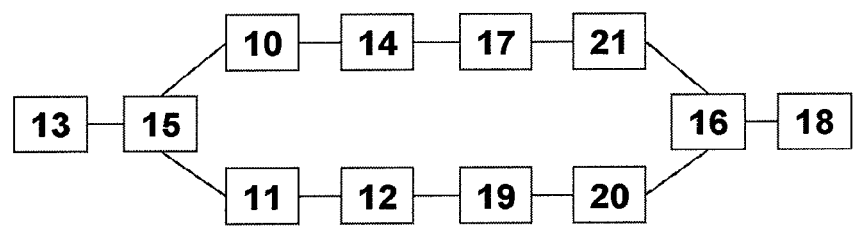

This algorithm can be implemented very easily and efficiently with simple comparisons. FIG. 7 shows another network topology. The local version of the method, will start at node 13, and proceed to find two diverging branches leading from node 15. The method explores the two separate paths as far as node 16, where the two paths converge again. At this point, the method examines the node identifiers for each of the two branches. For the first branch, the node identifiers are: 10, 14, 17, 21 and for the second branch the node identifiers are: 11, 12, 19, 20. The branch with the lowest identifier (10) is part of the top path. The method can simply backtrack from node 16 towards node 15, keeping track of the lowest node identifier found in each branch. At each backward step, the method compares the lowest node identifier found so far, with the new node identifier encountered at that step. The lowest node identifier is stored. When the method has backtracked as far as node 15, the two lowest values (10 in the top branch, 11 in the lower branch) can simply be compared to one another to find the branch having the lowest node identifier. Accordingly, the top branch, which forms part of the top path, is selected. The part of the path common to both of the diverging branches is ignored when performing this tie-breaking.

One of the most common algorithms for finding shortest cost paths in a network is Dijkstra's algorithm [Dijkstra 59]. It solves the problem of finding the shortest paths from a point in a graph (the source or root node) to all possible destinations when the length of a path is defined as the sum of the positive hop-by-hop link costs. This problem is sometimes called the single-source shortest paths problem. For a graph, G=(N, L) where N is a set of nodes and L is a set of links connecting them, Dijkstra's algorithm uses a priority queue, usually called TENT, to visit the nodes in order of increasing distance from the source node. The other data structures needed to implement Dijkstra's algorithm are:

Distance: an array of best estimates of the shortest distance from the source node to each node Parent: an array of predecessors for each node The following text describes the known Dijkstra's algorithm, and describes how it can be modified to perform a tie-break when multiple equal-cost paths are discovered. Dijkstra's algorithm is described here because it is one of the most commonly used shortest path finding algorithms. However, it will be appreciated that other algorithms could equally be used. The initialization phase sets the Distance of each node, except the source node itself, to Infinity. The Distance of the source node is set to zero and its Parent is set to Null as it is the root of the tree. At the start of the computation, the priority queue contains only the source node. As the algorithm progresses, nodes are added to the priority queue when a path from the source node to them is found. Nodes are pulled out of the priority queue in order of increasing distance from the source node, after the shortest path between them and the source node has been found. The algorithm stops when all the nodes reachable from the source node have been cycled through the priority queue. While the priority queue TENT is not empty, the algorithm performs the following steps:

1) Find the node N in TENT which is closest to the source node and remove it from TENT 2) For each node connected to N, if the node's distance to the source would be reduced by making N its parent, then change the node's parent to N, set the node's distance to the new distance, and add the node to TENT.

Upon completion of the algorithm, Distance(node) contains the shortest distance from the source node to the node (or Infinity if the node is not reachable from the source node) and Parent(node) contains the predecessor of the node in the spanning tree (except for the source node and the nodes which are not reachable from the source node). The parent of a node is updated only if changing parents actually reduces the node's distance. This means that, if multiple equal-cost shortest paths exist between the source node and some other node, only the first one encountered during the execution of the algorithm will be considered.

The above steps are conventional steps of Dijkstra's algorithm. At this point Dijkstra is modified to add a consistent tie-breaking step. Step 2 above is modified as follows:

2) For each node connected to node N do the following:

2a) if the node's distance to the source would be reduced by making N its parent, then change the node's parent to N, set the node's distance to the new distance, and add the node to TENT.

2b) if the node's distance to the source node would remain the same after making N its parent, then invoke the tie-breaking algorithm to determine if the node's parent should be changed.

The tie-breaking algorithm is invoked when a convergence point of two diverging branches is reached. For example, considering the topology shown in FIG. 7, if Dijkstra's algorithm is started from node 13, diverging branches are discovered leading from node 15 (an upper branch with nodes 10, 14, 17, 21 and a lower branch with nodes 11, 12, 19, 20) and these diverging branches converge at node 16. It is at node 16 that the tie-breaking algorithm would be invoked to select between the two branches.

The pseudo-code below shows an implementation of the modified Dikstra's algorithm with consistent tie-breaking using a priority queue implementation of the TENT set. The Enqueue operation takes two arguments, a queue and a node, and puts the node in the proper queue position according to its distance from the source node. The Dequeue operation removes from the queue the node at the head of the queue i.e. the node with the smallest distance from the source node.

```
for each Node in Network do Distance(Node) = Infinity;
Empty(Tent);
Distance(Source) = 0;
Parent(Source) = Null;
Node = Source;
do
    for each Link in OutgoingLinks(Node) do
        newDistance = Distance(Node) + Cost(Link);
        Child = EndNode(Link);
        if (newDistance < Distance(Child) do
            Distance(Child) = newDistance;
            Parent(Child) = Node;
            Enqueue(Tent, Child);
        else if (newDistance == Distance(Child) do
            Parent(Child) = TieBreak(Node, Parent(Child));
while (Node = Dequeue(Tent));
```

The tie-breaking algorithm operates by back-tracking the two equal-cost paths, starting from the current parent and the new candidate parent of the node respectively, all the way back to the divergence point. The fact that the two diverging paths may have a different number of hops complicates matters slightly as the two paths must be backtracked by an unknown, un-equal number of hops. This problem can be resolved by always back-tracking the longer of the two paths first or both simultaneously when they have equal-cost. Alternatively, this difficulty can be eliminated altogether by ensuring that two paths will only be considered to be of equal-cost if, and only if, they have the same number of hops. This is easily accomplished by either incorporating a hop count in the path cost or by using the hop count as a first order tie-breaker.

The following pseudo-code shows an implementation of the tie-breaking algorithm that assumes that the two paths have the same number of hops (and therefore so do their diverging branches). The tie-breaking function takes the two nodes at the end of two equal paths and returns one of them to indicate which of the two paths it selected.

```
old = old Parent;
new = newParent;
oldMinId = SysId(old);
newMinId = SysId(new);
while ((old=Parent(old)) != (new=Parent(new))) do
    tmp = SysId(old);
    if (tmp < oldMinId) do oldMinId = tmp;
    tmp = SysId(new);
    if (tmp < newMinId) do newMinId = tmp;
if (newMinId < oldMinId) return newParent;
else return oldParent;
```

The frequency with which the algorithm needs to be performed depends on the application. PLSB essentially needs to compute the all-pairs shortest paths (sometimes a subset thereof). In this case Dijkstra's algorithm needs to be run for all the nodes in the network (all but one to be precise). Floyd's algorithm computes the all-pairs shortest paths so it would need to be run only once. Other applications may only require the computation of a smaller number of paths (e.g. if only one shortest path is required then Dijkstra's algorithm would have to be run only once with one of the path's endpoints as the source).

Figure 8:
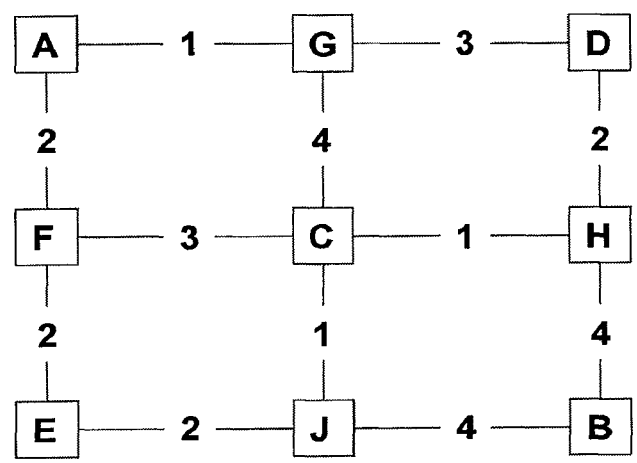
FIG. 8 shows a further example network topology for illustrating calculation of shortest paths.

FIG. 8 shows an example network of nodes A-H, J interconnected by links. For each link, a metric associated with that link is shown as an integer value on the link. There are six different, equal-cost, shortest paths between node A and node B in this network. These are shown in the table below with their respective length and path identifier:

| Path       | AGDHB | AGCHB | AGCJB | AFCHB | AFCJB | AFEJB |
|------------|-------|-------|-------|-------|-------|-------|
| Length     | 10    | 10    | 10    | 10    | 10    | 10    |
| Identifier | ABDGH | ABCGH | ABCGJ | ABCFH | ABCFJ | ABEFJ |

All of these six paths have the same length, 10. The non-local version of the tie-breaking algorithm will select the one with the smallest path identifier (ABCFH), i.e. path AFCHB. The remainder of this section shows how the local version of the tie-breaking algorithm arrives at the same result by making only local tie-breaking decisions as equal-cost paths and sub-paths are discovered during the execution of Dijkstra's algorithm. Dijsktra's algorithm initializes a table of distances and parents (or predecessors) for the nodes in the network. All the distances are initially set to infinity except for the source node whose distance is set to zero. The parents are undefined at this stage:

| Node     | A | B | C | D | E | F | G | H | J |
|----------|---|---|---|---|---|---|---|---|---|
| Distance | 0 | ∞ | ∞ | ∞ | ∞ | ∞ | ∞ | ∞ | ∞ |
| Parent   | — | — | — | — | — | — | — | — | — |

Dijkstra's algorithm also initializes its priority queue to contain only the source node, A: TENT=[(A, 0)].

The first iteration of the Dijkstra loop selects the first and only node in TENT, node A.

Then for each of node A's neighbours, namely nodes F and G, it updates their distance to the source and makes node A their parent. Finally these two nodes are added to the TENT priority queue.

During this first iteration of Dijkstra's algorithm the table of distances and parents becomes:

| Node     | A | B | C | D | E | F | G | H | J |
|----------|---|---|---|---|---|---|---|---|---|
| Distance | 0 | ∞ | ∞ | ∞ | ∞ | 2 | 1 | ∞ | ∞ |
| Parent   | — | — | — | — | — | A | A | — | — |

At the end of this first iteration the priority queue is: TENT= [(G, 1), (F, 2)].

The second iteration of the Dijkstra loop removes the node with the smallest distance, node G, from the priority queue. It updates two of G's neighbours that have not been processed yet, nodes C and D, and adds them to the priority queue:

| Node     | A | B | C | D | E | F | G | H | J |
|----------|---|---|---|---|---|---|---|---|---|
| Distance | 0 | ∞ | 5 | 4 | ∞ | 2 | 1 | ∞ | ∞ |
| Parent   | — | — | G | G | — | A | A | — | — |

At the end of the second iteration, the priority queue is: TENT=[(F, 2), (D, 4), (C, 5)].

Figure 9:
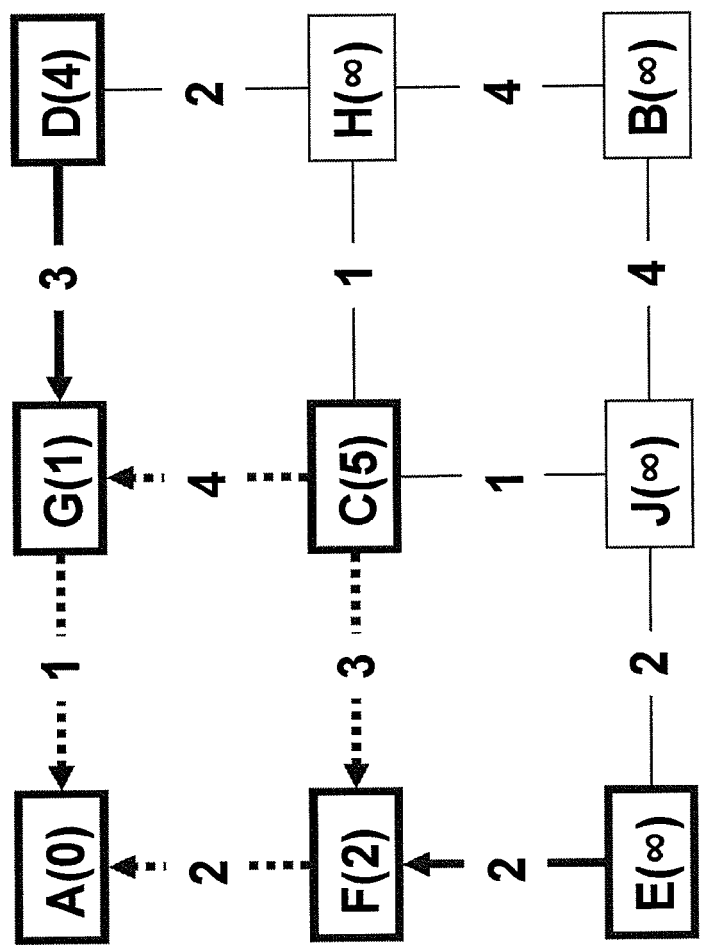
FIGS. 9 to 11 show tie-breaking steps of a shortest path calculation of the network topology shown in FIG. 8.

The third iteration of the Dijkstra loop removes node F from the priority queue. It updates two neighbours of node F, nodes C and E, and adds node E to the priority queue (node C is there already). The distance of node C does not change but there is a new candidate equal path between node A and node C going through node F. The tie-breaking algorithm must therefore be invoked to choose between this new path going through node F and the old one going through node G. This is shown in FIG. 9. The tie-breaking algorithm is invoked with the new candidate parent of node C, node F, and its old parent, node G. oldMin is set to the identifier of the old parent, G, and newMin is set to the identifier of the new parent, F. Because nodes F and G share the same parent (node A), the backtracking loop is not executed. The tiebreaking simply compares oldMin and newMin and because newMin=F<G=oldMin, node F is selected as the new parent of node C:

| Node | A | B | C | D | E | F | G | H | J |
|---|---|---|---|---|---|---|---|---|---|
| Distance | 0 | ∞ | 5 | 4 | 4 | 2 | 1 | ∞ | ∞ |
| Parent | — | — | F | G | F | A | A | — | — |

At the end of the third iteration, the priority queue is: TENT=[(D, 4), (E, 4), (C, 5)].

The fourth iteration of the Dijkstra loop removes one of the two nodes with distance 4, node D for instance, from the priority queue. Of D's two neighbours only one, node H, is updated and added to the priority queue:

| Node | A | B | C | D | E | F | G | H | J |
|---|---|---|---|---|---|---|---|---|---|
| Distance | 0 | ∞ | 5 | 4 | 4 | 2 | 1 | 6 | ∞ |
| Parent | — | — | F | G | F | A | A | D | — |

At the end of the fourth iteration, the priority queue is: TENT=[(E, 4), (C, 5), (H, 6)].

The fifth iteration of the Dijkstra loop removes node E from the priority queue. Of E's two neighbours only one, node J, is updated and added to the priority queue.

| Node | A | B | C | D | E | F | G | H | J |
|---|---|---|---|---|---|---|---|---|---|
| Distance | 0 | ∞ | 5 | 4 | 4 | 2 | 1 | 6 | 6 |
| Parent | — | — | F | G | F | A | A | D | E |

At the end of the fifth iteration, the priority queue is: TENT=[(C, 5), (H, 6), (J, 6)].

The sixth iteration of the Dijkstra's loop removes node C from the priority queue. Two of C's neighbours, nodes J and H, have equal-cost paths to node A through node C. The tie-breaking algorithm must therefore be invoked twice for nodes J and H respectively.

Figure 10:
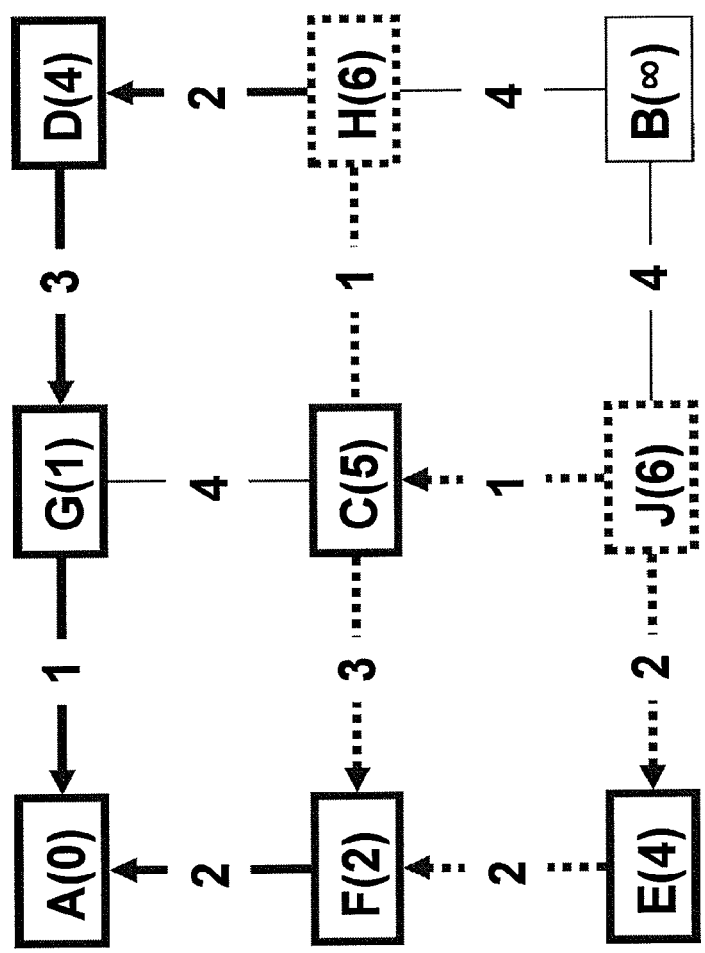

For node J, the tie-breaking algorithm is invoked with the new potential parent, node C, and the old parent, node E. oldMin is set to the identifier of the old parent, E, and newMin is set to the identifier of the new parent, C. Because these two nodes, E and C, share the same parent (node F), the backtracking loop is not executed. The tiebreaking simply compares oldMin and newMin and because newMin=C<E=oldMin, the new parent is selected. Node J's parent is therefore replaced by node C. This is shown in FIG. 10.

Figure 11:
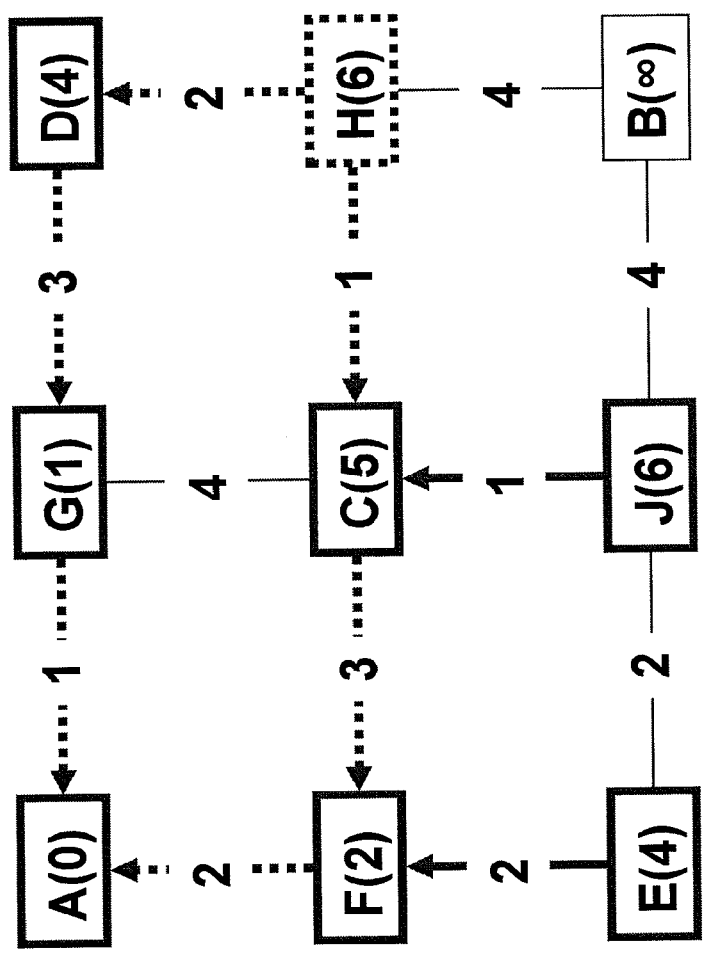

For node H, the tie-breaking algorithm is invoked with the new potential parent, node C, and the old parent, node D. oldMin is set to the identifier of the old parent, D, and newMin is set to the identifier of the new parent, C. Because these two nodes have different parents, both paths must be backtracked one hop further. D's parent is G and because G>oldMin (=D), oldMin does not change. C's parent is F and because F>newMin (=C), newMin does not change either. Because F and G share the same parent, node A, the backtracking loop stops. The tiebreaking algorithm then compares oldMin and newMin and because newMin=C<D=oldMin, node C is selected to become node H's new parent. This is shown in FIG. 11.

| Node | A | B | C | D | E | F | G | H | J |
|---|---|---|---|---|---|---|---|---|---|
| Distance | 0 | ∞ | 5 | 4 | 4 | 2 | 1 | 6 | 6 |
| Parent | — | — | F | G | F | A | A | C | C |

At the end of the sixth iteration, the priority queue is: TENT=[(H, 6), (J, 6)].

The seventh iteration of the Dijkstra's loop removes one of the two nodes with distance 6, node H for instance, from the priority queue. Only one of H's neighbours, node B, is updated and added to the priority queue:

| Node | A | B | C | D | E | F | G | H | J |
|---|---|---|---|---|---|---|---|---|---|
| Distance | 0 | 10 | 5 | 4 | 4 | 2 | 1 | 6 | 6 |
| Parent | — | H | F | G | F | A | A | C | C |

At the end of the seventh iteration, the priority queue is: TENT=[(J, 6), (B, 10)].

The eighth iteration of the Dijkstra's loop removes node J from the priority queue. Of J's neighbours, only node B needs to be updated. Its distance does not change but there is a new candidate equal path between node A and node B going through node J.

The tie-breaking algorithm is invoked with the new potential parent of node B, node J, and the old parent, node H. oldMin is set to the identifier of the old parent, H, and newMin is set to the identifier of the new parent, J. Because these two nodes, H and J, share the same parent (node C), the backtracking loop is not executed. The tiebreaking simply compares oldMin and newMin and because oldMin=H<J=newMin, the old parent is selected and node B's parent remains the same.

| Node | A | B | C | D | E | F | G | H | J |
|---|---|---|---|---|---|---|---|---|---|
| Distance | 0 | 10 | 5 | 4 | 4 | 2 | 1 | 6 | 6 |
| Parent | — | H | F | G | F | A | A | C | C |

At the end of the eighth iteration, the priority queue is: TENT=[(B, 10)].

Finally the last iteration of the Dijkstra's loop removes node B from the queue and the algorithm terminates because none of B's neighbours can be updated (node B is the node that is the furthest away from the source node A).

The reverse of the shortest path from node A to node B can be read directly from the parent table starting at node B and following the parents until node A is reached: BHCFA. The shortest path from node A to node B selected by the local tie-breaking algorithm is therefore its reverse path: AFCHB. Although there are 6 equal-cost paths between nodes A and B, the local tie-breaking was only invoked a total of 4 times during the execution of Dijkstra's algorithm. At its first invocation, the tie-breaking algorithm had to choose between sub-paths AFC and AGC. It selected sub-path AFC, thereby eliminating two paths, AGCJB and AGCHB, from further consideration. At its second invocation, the tie-breaking algorithm had to choose between sub-paths AFCJ and AFEJ. It selected sub-path AFCJ, thereby eliminating a third path, AFEJB, from further consideration. At its third invocation, the tie-breaking algorithm had to choose between sub-paths AGDH and AGCH. It selected sub-path AGCH, thereby eliminating a fourth path, AGDHB, from further consideration. Finally, at its fourth invocation, the tie-breaking algorithm had to choose between paths AFCHB and AFCJB. It eliminated a fifth path, AFCJB, and selected path AFCHB as the final solution.

Selection of Equal-Cost Multi-Paths for Load Spreading

Figure 12:
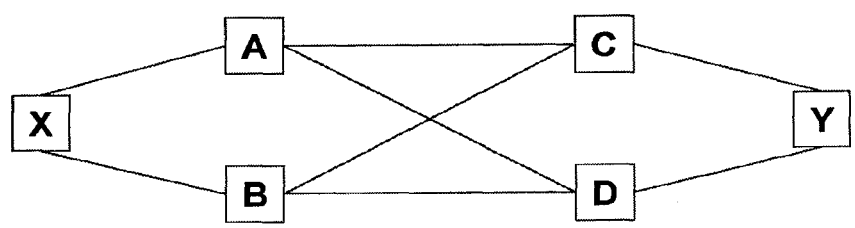
FIG. 12 shows an example of nodes dual-homed onto a mesh network.

In many networking applications it is often advantageous to use several equal-cost paths, especially if this can be achieved in a consistent fashion. By using two variants of the tie-breaking algorithm, it is possible to use two equal-cost paths between a pair of nodes when they exist. FIG. 12 shows a common networking scenario in which edge nodes X and Y are each dual-homed on a full mesh of core nodes A, B, C, D. For redundancy, each edge node is connected to two core nodes, with node X connected to core nodes A and B and node Y connected to nodes C and D. Each core node is connected to all of the other core nodes, e.g. node A is connected to B, C, and D. The problem with this topology is that if only one shortest path is used between a pair of nodes, a lot of access capacity will be wasted under normal circumstances. When multiple equal-cost shortest paths exist between two nodes, two variants of the tie-breaking algorithm can be used to consistently select exactly two paths. Any convention, agreed by all nodes, can be used to make the selection between equal-cost paths. One particularly convenient convention is to select a first path having the smallest identifier and a second path having the largest identifier. In FIG. 12, since the core nodes are fully meshed, four equal-cost paths exist between the edge nodes X and Y: (X, A, C, Y), (X, A, D, Y), (X, B, C, Y), (X, B, D, Y). The two variants of the tie-breaking algorithm will select these two paths:

(X, min(A, B), min(C, D), Y) and,
(X, max(A, B), max(C, D), Y).

Because the node identifiers are unique, min(A, B) !=max(A, B) and min(C, D) !=max(C, D): these two paths are maximally diverse: they have only their endpoints in common. In FIG. 12, the two selected paths are path (X, A, C, Y) and path (X, B, D, Y).

One of the important properties of the tie-breaking method described above is that a change to the network which does not affect one of the set of paths for which the tie-break needs to decide between has no impact on the outcome of the tie-break. Such changes may involve removal of parts of the network that are not on the selected paths, such as failed nodes or links. Another important property is that when multiple paths equal-cost paths are used, a failure in one path does not affect the stability of the others. Similarly, the addition of a link will only affect one of the equal cost paths, not both. This is important for stability of the network.

Figure 13A:
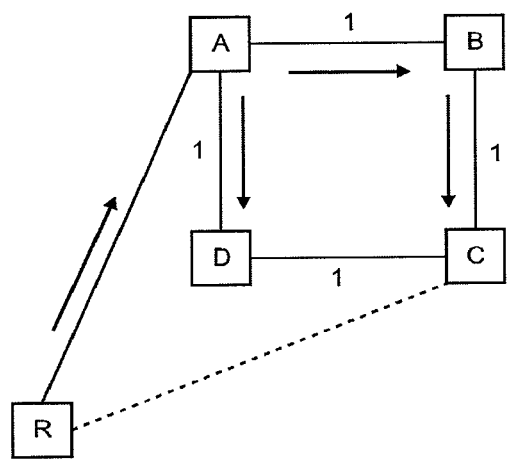
FIGS. 13A and 13B illustrate properties of the tie-breaking method of the invention.
Figure 13B:
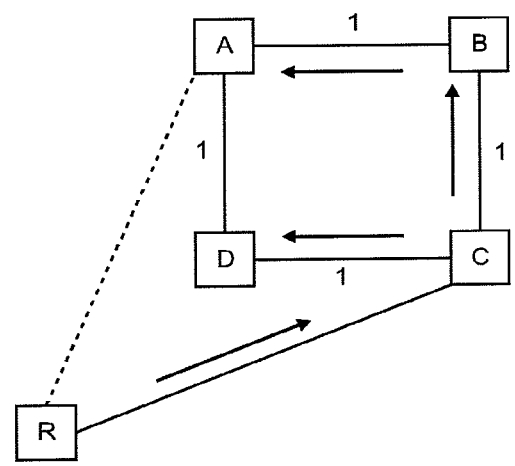

FIGS. 13A and 13B illustrate other important properties of the tie-breaking method of the present invention:

a single failure in the presence of equal-cost paths cannot force a loop;
a failure cannot both close the loop and shift the point of attachment of the root;
a failure cannot produce a shorter path;
the tie-breaking algorithm prevents ranking of equal-cost paths from changing the shortest path.

FIGS. 13A and 13B illustrate these properties with a simple network topology having nodes A, B, C, D and R. Considering FIG. 13A, the shortest path between R and a set of nodes A-D uses a link R-A. There is a choice of two equal-cost branches to reach node C from Node A. Using one of the tie-breaking methods described above, the branch A-B-C is consistently selected rather than the branch A-D-C. Similarly, in the reverse direction, the link C-B-A is consistently selected instead of C-D-A. FIG. 13B shows a situation, at a later point in time, when the link R-A has failed. Node R now connects to the set of nodes A-D via the next best link, R-C. There is a choice of two equal-cost branches to reach node A from Node C. Again, the branch C-B-A is consistently selected rather than the branch C-D-A. Without the use of this consistent tie-breaking algorithm, a loop A-B-C-D-A could arise following the failure in link R-A, with nodes A and B being slow and promiscuous in their behaviour and nodes C and D being agile. This property is particularly useful to guarantee loop freeness for multicast forwarding.

The invention is not limited to the embodiments described herein, which may be modified or varied without departing from the scope of the invention.

We claim:

1. A method of determining forwarding information for use in forwarding packets at a forwarding node of a packet-forwarding network, each node of the network having a unique node identifier, the method comprising:

determining, by the forwarding node, shortest paths between a first node and a second node of the network;

determining, by the forwarding node while determining the shortest paths, when multiple paths have equal cost; and selecting, by the forwarding node, one of the equal-cost paths, the selected equal-cost path having the property that, if the node identifiers assigned to nodes in each equal-cost path are sorted according to a first ordering criterion and concatenated in that order to derive a path identifier for each equal-cost path, wherein the first ordering criterion is independent of an order in which nodes corresponding to the node identifiers appear in the path, and the resulting path identifiers are sorted according to a second ordering criterion to derive an ordered list of path identifiers, then the selected equal-cost path is at one extreme of the ordered list of path identifiers.

2. A method as defined in claim 1, wherein the first ordering criterion is lexicographic ordering.

3. A method as defined in claim 1, wherein the second ordering criterion is lexicographic ordering.

4. A method as defined in claim 1, wherein the one extreme of the ordered list of path identifiers is a first location in the list of path identifiers.

5. A method as defined in claim 1, wherein the step of determining shortest paths between a first node and a second node of the network comprises iteratively forming a shortest path tree.

6. A forwarding node for a packet-forwarding network in which each of a plurality of nodes has a unique node identifier, the forwarding node comprising:

a processor; and a processor-readable medium storing instructions executable by the processor:

to determine shortest paths between a first node and a second node of the network;

to determine while determining the shortest paths, when multiple paths have equal cost; and to select one of the equal-cost paths, the selected equal-cost path having the property that, if the node identifiers assigned to nodes in each equal-cost path are sorted according to a first ordering criterion and concatenated in that order to derive a path identifier for each equal-cost path, wherein the first ordering criterion is independent of an order in which nodes corresponding to the node identifiers appear in the path, and the resulting path identifiers are sorted according to a second ordering to derive an ordered list of path identifiers, then the selected equal-cost path is at one extreme of the ordered list of path identifiers.

7. A forwarding node as defined in claim 6, wherein the first ordering criterion is 2 lexicographic ordering.

8. A forwarding node as defined in claim 6, wherein the second ordering criterion is lexicographic ordering.

9. A forwarding node as defined in claim 6, wherein the one extreme of the ordered list of path identifiers is a first location in the list of path identifiers.

10. A forwarding node as defined in claim 6, wherein the instructions executable by the processor to determine shortest paths between a first node and a second node of the network comprise instructions executable to iteratively form a shortest path tree.

11. A method of determining forwarding information for use in forwarding packets at a forwarding node of a packet-forwarding network, each node of the network having a unique node identifier, the method comprising:
determining, by the forwarding node, shortest paths between a first node and a second node of the network;
determining, by the forwarding node, when two shortest paths have equal cost; and
selecting, by the forwarding node, one of the equal-cost paths, the selected equal-cost path having the property that it includes the node which is not common to the equal-cost paths that has either the largest node identifier or the smallest node identifier of all of the nodes which are not common to the equal-cost paths.

12. A method as defined in claim 11, wherein the step of selecting one of the equal-cost paths comprises selecting the path which includes the smallest node identifier among the set of all node identifiers in the two paths that are not common to the two paths.

13. A method as defined in claim 11, wherein the step of selecting one of the equal-cost paths comprises selecting the path which includes the largest node identifier among the set of all node identifiers in the two paths that are not common to the two paths.

14. A method as defined in claim 11, wherein the step of determining shortest paths between a first node and a second node is performed by iteratively forming a shortest path tree.

15. A method as defined in claim 14, wherein the steps of defining first and second branch identifiers and selecting one of first and second paths is performed for each node at which two equal-cost paths converge.

16. A method as defined in claim 11, wherein the step of selecting one of the equal-cost paths is performed locally by considering only nodes on diverging branches of the equal-cost paths.

17. A method as defined in claim 16, wherein the step of selecting one of the equal-cost paths comprises selecting between a first equal-cost path having a first branch and a second equal-cost path having a second branch diverging from the first branch by:
defining a first branch identifier for the first branch by selecting a node identifier of a node on the first branch according to a first criterion;
defining a second branch identifier for the second branch by selecting a node identifier of a node on the second branch according to the first criterion;
selecting one of the first and second paths by applying a second criterion to the first and second branch identifiers.

18. A method according to claim 17, further comprising recording the node identifier which meets the first selection criterion in each of the diverging branches while backtracking to the node at which the first and second branches diverge.

19. A method according to claim 18, further comprising, at each backwards step, comparing the recorded node identifier with a new node identifier encountered at that step and recording the node identifier which meets the first selection criterion.

20. A method as defined in claim 11, wherein:
the steps of determining shortest paths between a first node and a second node and of determining when two paths have equal cost are performed using Dijkstra's algorithm; and
the step of selecting one of the equal-cost paths is integrated into the Dijkstra's algorithm.

21. A method as defined in claim 11, wherein:
more than two paths are equal-cost paths; and
the step of selecting one of the equal-cost paths comprises, for a succession of pairs of the equal-cost paths, comparing nodes that are not common to the pair of equal-cost paths.

22. A forwarding node for use in a packet-forwarding network, comprising:
a processor; and
a processor-readable medium storing instructions executable by the processor:
to determine shortest paths between a first node and a second node of the network;
to determine, while forming the shortest path tree, when two paths have equal cost; and
to select one of the equal-cost paths, the selected equal-cost path having the property that it includes the node which is not common to the equal-cost paths that has either the largest node identifier or the smallest node identifier of all of the nodes which are not common to the equal-cost paths.

23. A forwarding node as defined in claim 22, wherein the instructions executable to select one of the equal-cost paths comprise instructions executable to select the path which includes the smallest node identifier among the set of all node identifiers in the two paths that are not common to the two paths.

24. A forwarding node as defined in claim 22, wherein the instructions executable to select one of the equal-cost paths comprise instructions executable to select the path which includes the largest node identifier among the set of all node identifiers in the two paths that are not common to the two paths.

25. A forwarding node as defined in claim 22, wherein the instructions executable to determine shortest paths between a first node and a second node comprise instructions executable to iteratively form a shortest path tree.

26. A forwarding node as defined in claim 22, wherein:
more than two paths are equal-cost paths; and
the instructions executable to select one of the equal-cost paths comprise instructions executable to, for a succession of pairs of the equal-cost paths, compare nodes that are not common to the pair of equal-cost paths.

27. A forwarding node as defined in claim 22, wherein the instructions executable to select one of the equal-cost paths are performed locally by considering only nodes on diverging branches of the equal-cost paths.

28. A forwarding node as defined in claim 27, wherein the instructions executable to select one of the equal-cost paths comprise instructions executable to select between a first equal-cost path having a first branch and a second equal-cost path having a second branch diverging from the first branch by:
    defining a first branch identifier for the first branch by selecting a node identifier of a node on the first branch according to a first criterion;
    defining a second branch identifier for the second branch by selecting a node identifier of a node on the second branch according to the first criterion;
    selecting one of the first and second paths by applying a second criterion to the first and second branch identifiers.

29. A forwarding node according to claim 28, further comprising instructions executable to record the node identifier which meets the first selection criterion in each of the diverging branches while backtracking to the node at which the first and second branches diverge.

30. A forwarding node according to claim 29, further comprising instructions executable to, at each backwards step, compare the recorded node identifier with a new node identifier encountered at that step and record the node identifier which meets the first selection criterion.

31. A forwarding node as defined in claim 28, wherein the instructions executable to define first and second branch identifiers and to select one of first and second paths are performed for each node at which equal-cost paths converge.

32. A forwarding node as defined in claim 22, wherein:
    the instructions executable to determine shortest paths between a first node and a second node and to determine when two paths have equal cost implement Dijkstra's algorithm; and
    the instructions executable to select one of the equal-cost paths are integrated into the Dijkstra's algorithm.

33. A method of determining forwarding information for use in forwarding packets at a forwarding node of a packet-forwarding network, the forwarding node having a processor and each node of the network having a unique node identifier, the method comprising:
    determining, by the forwarding node, shortest paths between a first node and a second node of the network;
    determining, by the forwarding node, when a plurality of shortest paths have substantially equal-cost;
    forming, by the forwarding node for each substantially equal-cost path, a set of node identifiers which define the set of nodes in the path;
    ordering, by the forwarding node, each set of node identifiers using a first ordering criterion and concatenating the node identifiers in that order to form a path identifier, wherein the first ordering criterion is independent of an order in which nodes corresponding to the node identifiers appear in the path; and
    selecting, by the forwarding node, between the plurality of equal-cost paths by comparing the path identifiers.

34. A method as defined in claim 33, wherein the step of determining shortest paths between a first node and a second node is performed by iteratively forming a shortest path tree.

35. A forwarding node for use in a packet-forwarding network, comprising:
    a processor; and
    a processor-readable medium storing instructions executable by the processor:
        to determine shortest paths between a first node and a second node of the network;
        to determine when a plurality of shortest paths have equal-cost;
        to form for each equal-cost path, a set of node identifiers which define the set of nodes in the path;
        to select one of the equal-cost paths, the selected equal-cost path having the property that, if the node identifiers assigned to nodes in each equal-cost path are sorted according to a first ordering criterion and concatenated in that order to derive a path identifier for each equal-cost path, wherein the first ordering criterion is independent of an order in which nodes corresponding to the node identifiers appear in the path, and the resulting path identifiers are sorted according to a second ordering to derive an ordered list of path identifiers, then the selected equal-cost path is at one extreme of the ordered list of path identifiers.

36. A forwarding node as defined in claim 35, wherein the instructions executable to determine shortest paths between a first node and a second node comprise instructions executable to iteratively form a shortest path tree.

37. A method of determining forwarding information for use in forwarding packets at a forwarding node of a packet-forwarding network, the forwarding node having a processor and each node of the network having a unique node identifier, the method comprising:
    determining, by the forwarding node, shortest paths between a first node and a second node of the network;
    determining, by the forwarding node while determining the shortest paths, when a plurality of paths have equal-cost, each equal-cost path comprising a branch which diverges from a divergence node common to the equal-cost paths;
    selecting, by the forwarding node, in each diverging branch, a node identifier using a first selection criterion to form a branch identifier, the first selection criterion being independent of an order in which nodes corresponding to the node identifiers appear in the branch; and
    selecting, by the forwarding node, between the plurality of branches by comparing the branch identifiers.

38. A method as defined in claim 37, wherein the step of determining shortest paths between a first node and a second node is performed by iteratively forming a shortest path tree.

39. A method according to claim 37, further comprising recording the node identifier which meets the first selection criterion in each of the diverging branches while backtracking to the node at which the first and second branches diverge.

40. A method according to claim 39, further comprising, at each backwards step, comparing the recorded node identifier with a new node identifier encountered at that step and recording the node identifier which meets the first selection criterion.

41. A method as defined in claim 37, wherein:
    the steps of determining shortest paths between a first node and a second node and of determining when two paths have equal cost are performed using Dijkstra's algorithm; and
    the step of selecting one of the equal-cost paths by comparing identifiers of nodes that are common to the two paths is integrated into the Dijkstra's algorithm.

42. A forwarding node for use in a packet-forwarding network, comprising:
    a processor; and
    a processor-readable medium storing instructions executable by the processor:
        to determine shortest paths between a first node and a second node of the network;

to determine, while forming the shortest path tree, when a plurality of paths have equal-cost, each equal-cost path comprising a branch which diverges from a divergence node common to the equal-cost paths;

to select, in each diverging branch, a node identifier using a first selection criterion to form a branch identifier, the first selection criterion being independent of an order in which nodes corresponding to the node identifiers appear in the branch; and to select between the plurality of branches by comparing the branch identifiers.

43. A forwarding node as defined in claim 42, wherein the instructions executable to determine shortest paths between a first node and a second node are executable to iteratively form a shortest path tree.

44. A forwarding node according to claim 42, wherein the instructions further comprise instructions executable to record the node identifier which meets the first selection criterion in each of the diverging branches while backtracking to the node at 4 which the first and second branches diverge.

45. A forwarding node according to claim 44, further comprising instructions executable to compare, at each backwards step, the recorded node identifier with a new node identifier encountered at that step and recording the node identifier which meets the first selection criterion.

46. A forwarding node as defined in claim 42, wherein:
the instructions executable to determine shortest paths between a first node and a second node and to determine when two paths have equal cost implement Dijkstra's algorithm; and
the instructions executable to select one of the equal-cost paths by comparing identifiers of nodes that are common to the two paths are integrated into the Dijkstra's algorithm.

* * * * *